United States Patent
Li et al.

(10) Patent No.: US 9,529,934 B2
(45) Date of Patent: *Dec. 27, 2016

(54) XPATH EVALUATION IN AN XML REPOSITORY

(71) Applicant: International Business Machines Corporation, Armonk, NY (US)

(72) Inventors: Bian Li, Beijing (CN); Yuan Li, Beijing (CN); Chang H. Liu, Beijing (CN); Xiaoyi Wang, Beijing (CN); Yunting Wang, Beijing (CN); Shuo Wu, Beijing (CN); Kang Xu, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/822,033

(22) Filed: Aug. 10, 2015

(65) Prior Publication Data

US 2015/0347623 A1 Dec. 3, 2015

Related U.S. Application Data

(63) Continuation of application No. 12/890,961, filed on Sep. 27, 2010, now Pat. No. 9,135,367.

(30) Foreign Application Priority Data

Sep. 29, 2009 (CN) .......................... 2009 1 0179142

(51) Int. Cl.
G06F 17/30 (2006.01)
(52) U.S. Cl.
CPC ... *G06F 17/30935* (2013.01); *G06F 17/30345* (2013.01); *G06F 17/30932* (2013.01); *G06F 17/30938* (2013.01)

(58) Field of Classification Search
CPC ............... G06F 17/30935; G06F 17/30345; G06F 17/30938; G06F 17/30911; G06F 17/30321; G06F 17/3092; G06F 17/30932

(Continued)

(56) References Cited

U.S. PATENT DOCUMENTS 7,162,485 B2   1/2007   Gottlob et al.
7,398,265 B2   7/2008   Thusoo et al.

(Continued)

FOREIGN PATENT DOCUMENTS

CN    1941743      4/2007
CN    1965316      5/2007
WO    2009090130   7/2009

OTHER PUBLICATIONS

Dan Olteanu, "SPEX: Streamed and Progressive Evaluation of XPath", http://www.comlab.ox.ac.uk/people/Dan.Olteanu/papers/INFOSYS-TR-2005-6.pdf, accessed from internet Jul. 23, 2010, pp. 1-14.

(Continued)

*Primary Examiner* — Evan Aspinwall
(74) *Attorney, Agent, or Firm* — Terry J. Carroll; Edell, Shapiro & Finnan, LLC

(57) ABSTRACT

XPath evaluation in an XML data repository includes parsing an input XPath query using a simple path file to generate an execution tree about the XPath query, where the simple path file includes an XML file that is generated based on the hierarchical architecture of a plurality of XML files in the data repository, and the names of the nodes in the generated XML file are generated by recording the tag information of respective nodes in the plurality of XML files in the data repository. Execution of an execution tree for the data repository generates a final evaluation result.

9 Claims, 7 Drawing Sheets

(58) Field of Classification Search
USPC .......................................................... 707/771
See application file for complete search history.

(56) References Cited

U.S. PATENT DOCUMENTS

| | | | |
|---|---|---|---|
| 7,493,305 | B2 | 2/2009 | Thusoo et al. |
| 7,499,931 | B2 | 3/2009 | Fernandes et al. |
| 7,512,592 | B2 | 3/2009 | Lemoine |
| 7,603,347 | B2 | 10/2009 | Thusoo et al. |
| 7,747,610 | B2 | 6/2010 | Chinchwadkar et al. |
| 8,219,901 | B2 | 7/2012 | Denoual |
| 2003/0163285 | A1 | 8/2003 | Nakamura et al. |
| 2004/0064466 | A1 | 4/2004 | Manikutty et al. |
| 2005/0187906 | A1 | 8/2005 | Madan et al. |
| 2005/0228786 | A1* | 10/2005 | Murthy ............. G06F 17/30917 |
| 2005/0257201 | A1 | 11/2005 | Rose et al. |
| 2006/0031233 | A1 | 2/2006 | Liu et al. |
| 2006/0080345 | A1 | 4/2006 | Murthy et al. |
| 2008/0059439 | A1 | 3/2008 | Fan et al. |
| 2008/0114803 | A1* | 5/2008 | Chinchwadkar .. G06F 17/30935 |
| 2008/0141114 | A1* | 6/2008 | Abe .................... G06F 17/2247 715/234 |
| 2009/0037379 | A1 | 2/2009 | Bou-Diab et al. |
| 2010/0306219 | A1 | 12/2010 | Sthanikam et al. |
| 2011/0078186 | A1 | 3/2011 | Li et al. |

OTHER PUBLICATIONS

Venkatesh Raghavan, "VAMANA: A High Performance, Scalable and Cost Driven XPath Engine", May 2004, pp. 1-51.
Dan Olteanu et al., "An Efficient Single-Pass Query Evaluator for XML Data Streams", Technical Report, Institute for Computer Science, Munich, Germany, 2004, pp. 1-6.
Guogen Zang, "Building a Scalable Native XML Database Engine on Infrastructure for Relational Database", IBM Silicon Valley Lab, San Jose, CA, XIME-P, 2005, pp. 1-8.
Quanzhong Li, et al., "Indexing and Querying XML Data for Regular Path Expressions", Dept. of Computer Science, University of Arizona, Tuscson, AZ, Proc. VLDB Conference, 2001, pp. 361-370.
Matthias Nicola, et al., "Native XML Support in DB2 Universal Database", IBM Silicon Valley Lab, San Jose, CA, Proc. VLDB Conference, 2005, pp. 1164-1174.
Haifeng Jiang, et al., "Path Materialization Revisited: an Efficient Storage Model for XML Data", Dept. of Computer Science, The Hong Kong University of Science and Technology, Clear Water Bay, Hong Kong, Chinas, AICE, 2000, pp. 1-10.
Muralidhar Krishnaprasad, et al., "Query Rewrite for XML in Oracle XML DB", Oracle Corporation, Redwood Shores, CA, Proc. VLDB Conference, 2004, pp. 1134-1145.
Daniela Florescu, et al., "The BEA Streaming XQuery Processor", BEA Systems, San Jose, CA, Proc. VLDB Conference, 2003, pp. 1-25.
Shankar Pal, et al., "XQuery Implementation in a Relational Database System", Microsoft Corporation, Redmond, WA, Proc. VLDB Conference, 2005, pp. 1175-1186.
Masatoshi Yoshikawa, et al., "XRel: A Path-Based Approach to Storage and Retrieval of XML Documents Using Relational Databases", Nara Institute of Science and Technology, ACM Transactions on Internet Technology, 2001, pp. 1-29.
China Patent Office Action dated Feb. 22, 2013, 9 pages.
Olli Luoma, "Efficient Queries on XML Data through Partitioning", WEBIST 2007, Turku, Finland, pp. 98-108.
Oracle Berkeley DB XML. 2009. http://www.oracle.com/database/berkeley-db/xml/index.html.
H. Jiang, W. Wang, H. Lu, J. Xu Yu, "Holistic Twig Joins on Indexed XML Documents", VLDB, 2003.
Schmidt, A., Waas, F., Kersten, M.L., Carey, M.J., Manolescu, I., and Busse, R., "XMARK: A Benchmark for XML Data Management", In Proceedings of VLDB, 2002.
CN920080139CN1, Method and System for Simple Path Clustering Based XML Data Storage and XPath Processing, 2008.
Chinese Patent Office, Office Action 100037, Jul. 2, 2012, 6 pages.

* cited by examiner

XPATH EVALUATION IN AN XML REPOSITORY

CROSS-REFERENCE TO RELATED APPLICATIONS

This application is a continuation of U.S. patent application Ser. No. 12/890,961, entitled "XPATH EVALUATION IN AN XML REPOSITORY" and filed Sep. 27, 2010, the disclosure of which is incorporated herein by reference in its entirety.

BACKGROUND

1. Technical Field

The present invention relates to an XPath evaluation, and more specifically, relates to a method and system for XPath evaluation in XML data repository.

2. Discussion of the Related Art

XPath is a query language provided for addressing nodes in XML files. At present, the volumes of data encoded in XML format is increasing ferociously. Therefore, how to evaluate an XML-based query process efficiently, i.e. how to execute an XPath evaluation efficiently, for huge amounts of XML data becomes a big challenge for a person skilled in the art. A person skilled in the art has made many attempts in this respect.

There are generally two known methods to evaluate an XPath query.

In a first method, the XPath language is first transformed into the SQL language, and subsequently a query is made in a database based on SQL. For example, a technical solution of querying based on Oracle XML DB is disclosed in Muralidhar Krishnaprasad, Zhen Hua Liu, Anand Manikutty, James W. Warner, Vikas Arora, Susan Kotsovolos, "*Query Rewrite for XML in Oracle XML DB*", *Proc. VLDB.* 2004; a technical solution of querying based on SQL Server 2008 is disclosed in Shank Pal, Istvan Cseri, Oliver Seeliger, Michael Rys, Gideon Schaller, Wei Yu, D. Tomic, A. Baras, Brandon Berg, Denis Churin, "*XQuery Implementation in a Relational Database System*", *VLDB.* 2005; a technical solution of querying based on BEA XQuery Processor is disclosed in Daniela Florescu, Chris Hillery, Donald Kossmann, Paul Lucas, Fabio Riccardi, Till Westmann, Michael J. Carey, Arvind Sundararajan, "*The BEA/XQRL Streaming XQuery Processor*", *Proc. VLDB,* 2003; a technical solution of querying based on Open-source XML DB is disclosed in "*Oracle Berkeley DB XML*", 2009 (http://www.oracle.com/database/berkeley-db/xml/index.html); and a technical solution is also disclosed in Q. Li, B. Moon, "*Indexing and Querying XML Data for Regular Path Expressions*", *VLDB* 2001 and M. YoshiKawa, T. Amagasa. XRel, "*A Path-based Approach to Storage and Retrieval of XML Documents using Relational Databases*", *ACM Transactions on Internet Technology,* 2001.

However, there are problems associated with the first method. For example, it is hard for this method to maintain the changes in an XML schema. In this method, if an XML schema is changed, the structures of the tables in the database are intended to change, and the mapping relationship between the XPath query and the SQL query is also intended to change. Those changes are always complicated and time-consuming, and are likely to cause errors. Additionally, in the first method, the cost for an SQL executing join operation is significant.

In a second method, an XPath is evaluated directly for each XML instance. For example, a technical solution of querying based on IBM DB2 is disclosed in Matthias Nicola, Bertvander Linden, "*Native XML Support in DB2 Universal Database*", VLDB. 2005 and Guogen Zhang, "*Building a Scalable Native XML Database Engine on infrastructure for a Relational Database*", XIME-P 2005; and a technical solution is also disclosed in Haifeng Jiang, Hongjun Lu, Wei Wang, Jeffrey Xu Yu, "*Path Materialization Revisited: An Efficient Storage Model for XML Data*", AICE2000 and H. Jiang, W. Wang, H. Lu, J. Xu Yu, "*Holistic Twig Joins on Indexed XML Documents*", *VLDB.* 2003.

However, there are also problems associated with the second method. For example, in the second method, it is necessary to calculate a context for each XML instance, such that the evaluations are expensive.

It is desirable to provide an efficient XPath evaluation technique that addresses the above-noted problems.

SUMMARY OF THE INVENTION

The present invention provides a number of advantages including, without limitation, solving and alleviating at least one of the above described problems associated with known methods for evaluating XPath queries.

According to an example embodiment of the present invention, a method for XPath evaluation in an XML data repository comprises parsing an input XPath query using a simple path file to generate an execution tree about the XPath query, where the simple path file comprises an XML file that is generated based on a hierarchical architecture of a plurality of XML files in the data repository, and node names of nodes in the generated XML file are generated by recording the tag information of respective nodes in the plurality of XML files in the data repository. The method further comprises executing an execution tree for the data repository to generate a final evaluation result.

In an example embodiment, the simple path file includes a tree-like structure comprising root nodes and child nodes.

In another example embodiment, the simple path file is updated by XML files added into the data repository.

In still another example embodiment, the execution tree includes primary nodes, and the primary nodes comprise result nodes that are obtained when each query step for the XPath query is completed in the XPath parsing.

In a further example embodiment, the parsing of the XPath query further comprises performing an axis evaluation and checking names in the XPath query to select, as a current primary node, a node in the simple path file whose name is consistent with that in the XPath query, determining whether the current primary node includes a predicate and, in response to the current primary node not including a predicate, updating the execution tree.

In another example embodiment, the parsing of the XPath query further comprises the step of performing predicate evaluation in response to the current primary node including a predicate.

In another example embodiment, parsing step can begin from a root node of the simple path file.

In another example embodiment, updating the execution tree further comprises adding a predicate node to reflect information on the relative order of the nodes in the XPath query.

In another example embodiment, updating the execution tree further comprises updating position information of the predicate node.

In another example embodiment, the method further comprises storing data into the data repository in a orderly manner, according to each node in the simple path file.

In another example embodiment of the present invention, a system for XPath evaluation in an XML data repository comprises a parser to parse an inputted XPath query using a simple path file to generate an execution tree about the XPath query, where the simple path file is an XML file that is generated based on a hierarchical architecture of a plurality of XML files in the data repository, and node names of nodes in the generated XML file are generated by recording the tag information of respective nodes in the plurality of XML files in the data repository. The system further comprises an executor to execute the execution tree for the data repository to generate a final evaluation result.

The present invention provides a number of advantages including, without limitation, an advantage of it being easy to maintain the changes in schema of XML files due to the fact that the simple path file can be directly modified.

Another non-limiting example of an advantage of the present invention is that the computation resources can be saved and the efficiency car be improved due to the fact that it is not necessary to calculate a context for each XML instance.

Sill another non-limiting example of an advantage of the present invention is that a linear evaluation time can be provided. For example, according to the present invention, data can be stored in the data repository in a orderly manner in advance. Therefore, efficiency can be further improved.

The above and further features and advantages of embodiments of the present invention will become apparent from the following detailed description thereof, when taken in conjunction with the attached drawings wherein like reference numerals in the various figures are utilized to designate like components.

DETAILED DESCRIPTION

Various example embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one example embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the embodiments could have different values.

A method 1000 for XPath evaluation in an XML data repository according to an example embodiment of the present invention is described with reference to the flowchart depicted in FIG. 1.

Figure 1:
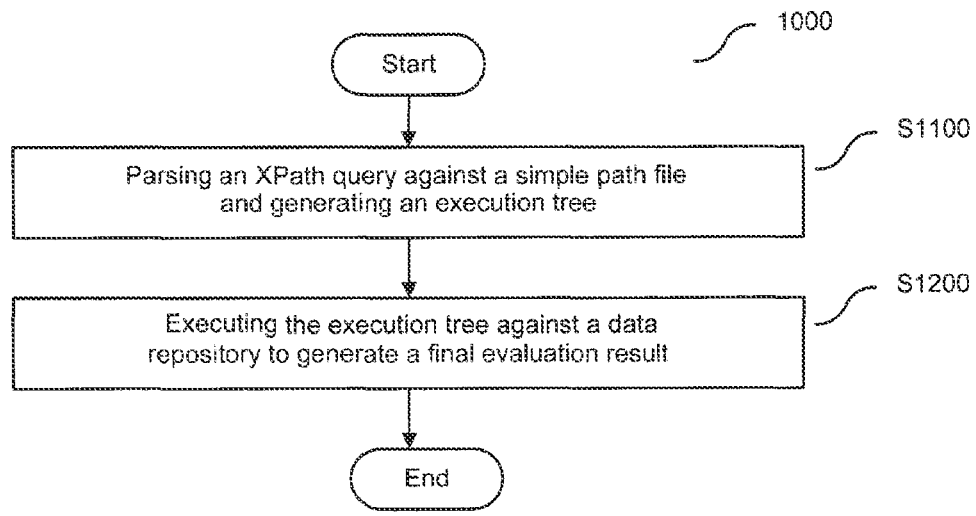
FIG. 1 is a flowchart showing a method according to an embodiment of the present invention.

As shown in FIG. 1, in step S1100, a parsing step of parsing an inputted XPath query using a simple path file and generating an execution tree about the XPath query is performed.

The way of generating an execution tree will be described in detail below with reference to FIGS. 5-7 and 8.

For example, the simple path file is an XML file which is generated based on the hierarchical architecture of a plurality of XML files in the data repository, and the node names of the nodes in the generated XML file are generated by recording the tag information of respective nodes in the plurality of XML files in the data repository.

The simple repository path file will be described in detail below with reference to FIGS. 3 and 4.

In step S1200, an executing step of executing the execution tree for the data repository to generate the final evaluation result is performed.

An example method of executing the execution tree is now described in detail with reference to FIG. 9.

It should be understood by a person skilled in the art that, although a generating step, a parsing step and an executing step have been demonstrated sequentially hereinabove, the present invention is not limited to such an order. For example, a step of generating a simple path file for all XML files in the data repository can be performed in advance. If all the XML files in the data repository are not changed, only the parsing step and executing step might be performed in the subsequent steps, without performing the generating step.

Hereinafter, a system 2000 for XPath evaluation in an XML data repository according to an embodiment of the present invention will be described with reference to FIG. 2.

Figure 2:
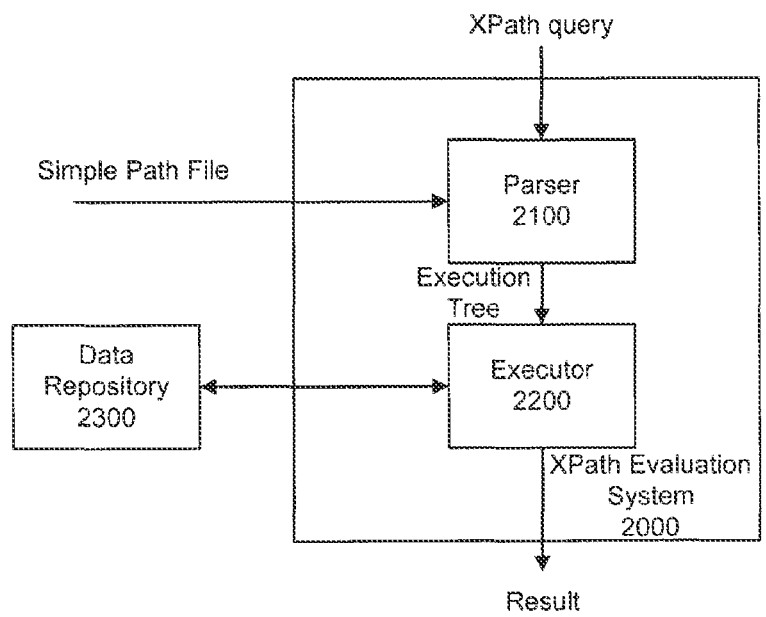
FIG. 2 is a block diagram showing a system according to an embodiment of the present invention.

As shown in FIG. 2, the XPath evaluation system 2000 according to the present invention includes parser 2100 and executor 2200.

The parser 2100 is used for parsing an inputted XPath query using a generated simple path file and generating an execution tree about the XPath query.

For example, the simple path file is an XML file which is generated based on the hierarchical architecture of a plurality of XML files in the data repository, and the node names of the nodes in the generated XML file are generated by recording the tag information of respective nodes in the plurality of XML files in the data repository.

The executor 2200 is used for executing the execution tree for the data repository to generate the final evaluation result.

The XPath evaluation system 2000, for example, can be connected to a data repository 2300 or include the data repository 2300. The data repository 2300 stores XML files. The XML files contain data information.

The example of an XPath evaluation system 2000 according to the present invention can be used for implementing an example method for XPath evaluation in an XML data repository according to the present invention. The features described below can be applied to the method for XPath evaluation in an XML data repository and the example XPath evaluation system according to the present invention.

An example of a simple path file is now described with reference to FIG. 3. Two XML instances and the tree structure of a simple path file are shown in FIG. 3.

Instance 1 (a1) includes a root node ("Article"), a plurality of child nodes ("Author", "Content", "Name", "Age"), corresponding texts ("John", "29") and attributes ("SN=100"). Instance 1 can be expressed in XML format as follows:

```
... ...
<Article SN="100">
    <Author>
        <Name> John </Name>
        <Age> 29 </Age>
    </Author>
    <Content> </Content>
</Article>
... ...
```

Instance 2 (a2) includes a root node ("Article"), a plurality of child nodes ("Author", "Content", "Name", "Gender"), corresponding texts ("Sarah", "Female") and attributes ("SN=8"). Instance 2 can be represented in XML format as follows:

```
... ...
<Article SN="8">
    <Author>
        <Name> Sarah </Name>
        <Gender> Female </Gender>
    </Author>
    <Content> </Content>
</Article>
... ...
```

A simple path file can be obtained from Instances 1 and 2.

An example structure of the simple path file includes a root node, a plurality of child nodes ("Article", "Author", "Content", "Name", "Age", "Gender") and attributes ("SN"). A plurality of child nodes contained in the simple path file can include all nodes and attributes in Instances 1 and 2.

The simple path file can be expressed in XML format as follows:

```
... ...
<Root>
    <Article>
        <Author>
            <Name/>
            <Age/>
            <Gender/>
        </Author>
        <content/>
        <SN/>
    </Article>
</Root>
... ...
```

As described above, each simple path (sp) in the simple path file corresponds to a set of XML nodes. For example, as shown in the example of FIG. 3, the path "/Article/Author" in the simple path file corresponds to the node "Author" in Instance 1 and the node "Author" in Instance 2. A set of XML nodes corresponding to each path (sp) in the simple path file can be expressed as NodeSet (sp) If the nodes corresponding to each path "/root/sp" in the simple path file are expressed by n, the set of XML nodes can also be expressed as Nodeset(n), where n can be, for example, integer, natural number, etc. In the b. Simple Path File shown in FIG. 3, an ID, i.e. SPid, is assigned to each node. Each node in the simple path file can be identified by its corresponding identifier SPid. Therefore, for example, the set of XML nodes can also be expressed as Nodeset (SPid).

Figure 3:
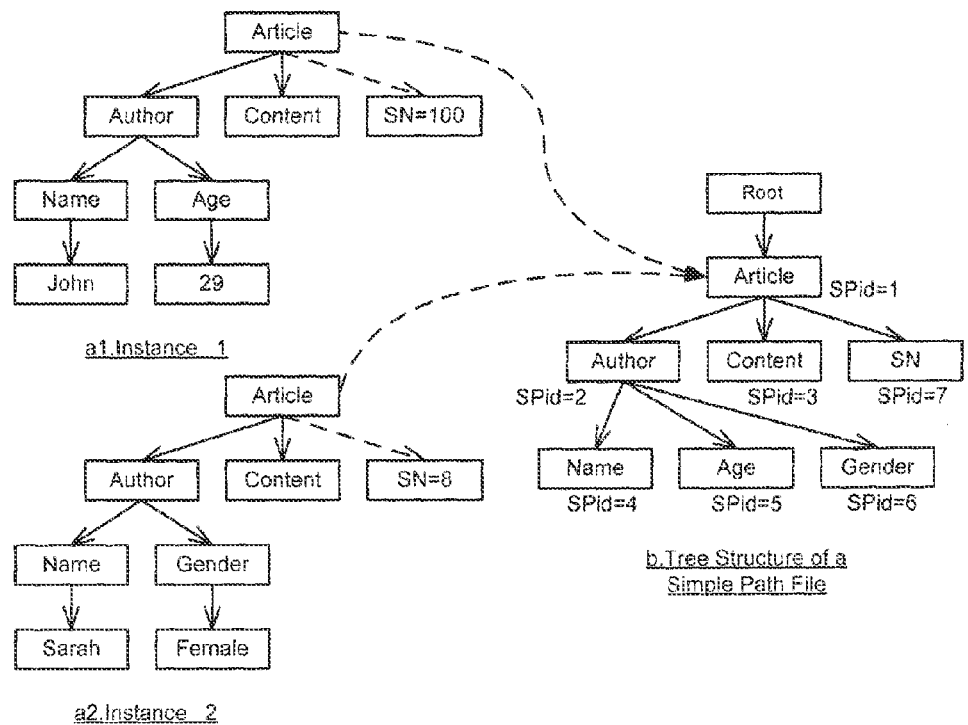
FIG. 3 is a schematic diagram showing an example for describing a simple path file according to an embodiment of the present invention.

As shown in FIG. 3, the simple path file is an XML file which is generated based on the hierarchical architecture of all or a plurality of XML files in the data repository, where the node names of the nodes in the generated XML file are generated by recording the tag information of respective nodes in the plurality of XML files in the data repository. The simple path file includes a tree-like structure composed of root nodes and child nodes.

For example, the tag information includes the names of nodes in the XML files (for example, Article), and the tag information also includes the names of attributes in the XML files (for example, SN).

For the hierarchical architecture of Instance 1, as shown in FIG. 3, the node "Article" has child nodes of "Author", "Content" and an attribute "SN=100", the node "Author" has child nodes of "Name" and "Age", the node "Name" has a value of "John", and the node "Age" has a value of "29".

For the hierarchical architecture of Instance 2, as shown in FIG. 3, the node "Article" has child nodes of "Author", "Content" and an attribute "SN=8", the node "Author" has child nodes of "Name" and "Gender", the node "Name" has a value of "Sarah", and the node "Gender" has a value of "Female".

The hierarchical architecture of the simple path file generated from Instances 1 and 2 is also shown in FIG. 3, where the root node has a child node of "Article", the node "Article" has child nodes of "Author", "Content" and an attribute "SN", and the node "Author" has child nodes of "Name", "Age" and "Gender".

Furthermore, as described above, a simple path file can be generated and stored before an XPath evaluation in advance. When a XPath query is received, the simple path file being stored in advance can be directly used. When new data (an XML file) is added into the data repository, the simple path file can be updated to reflect the hierarchical structure and tag information of the new data.

Hereinafter, a process for querying data from the data repository by using the simple path file will be described below with reference to FIG. 4, which shows an example of querying data from the data repository.

Figure 4:
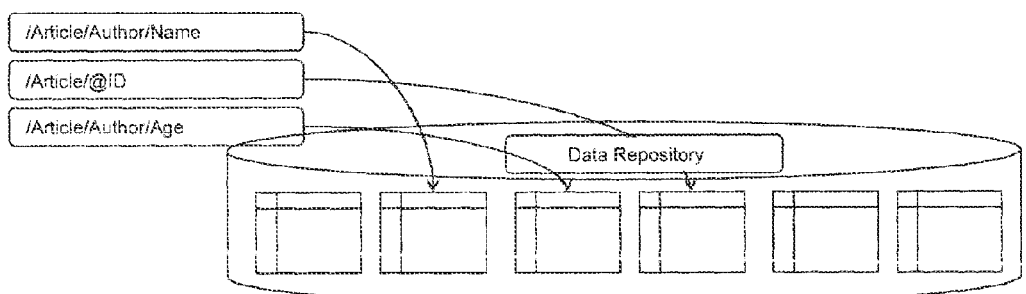
FIG. 4 is a schematic diagram showing an example for describing querying data from a data repository according to an embodiment of the present invention.

In the example of FIG. 4, the query being performed is: "/Article[@SN=100]/Author [Age<30]/Name".

According to the query, three simple paths can be obtained: "Root/Article/Author/Name", "Root/Article/SN", and "Root/Article/Author/Age".

As shown in FIG. 4, the data repository includes a plurality of storage blocks for storing the data of file nodes.

The data repository queries corresponding storage blocks from the data repository according to the above three simple paths, and sorts, joins and merges the data in the three storage blocks, such that the names of the article authors who satisfy "SN=100" and "Age<30" can be obtained.

An execution tree is an intermediate data structure in the XPath evaluation process. The execution tree is used for recording context information in the parsing process (parsing step or parser) of an XPath query. For example, the execution tree is input as context information at the beginning of the process (step or operation) of parsing each XPath query, and is output as context information at the end of the process (step or operation) of parsing each XPath query. The execution tree is finally executed (for example, by an executor) to generate a final evaluation result. For example, in the XPath evaluation process, the execution tree can be temporarily stored in a storage device, such as in a cache (not shown) of the system performing the XPath evaluation.

Figure 5:
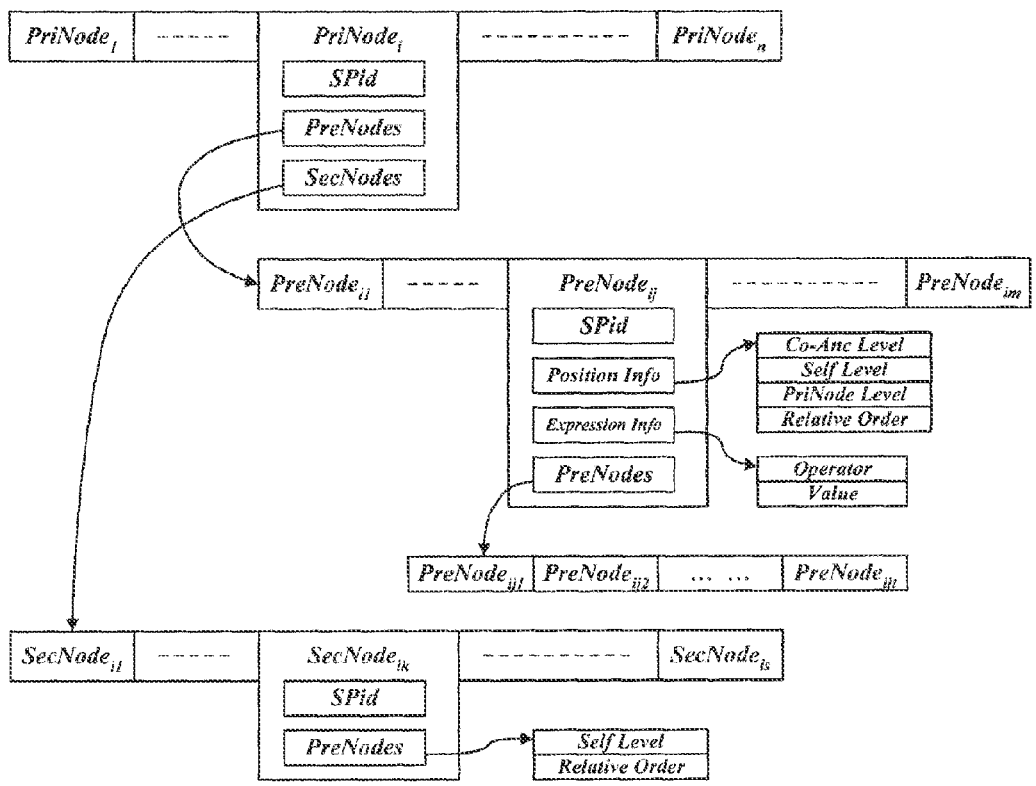
FIG. 5 is a schematic diagram showing an example of an execution tree according to an embodiment of the present invention.

An example embodiment of a general structure of the execution tree is shown in FIG. 5. As shown in FIG. 5, the execution tree includes a plurality of primary nodes $PriNode_1, \ldots, PriNode_i, \ldots PriNode_n$, where n is a positive integer. The execution tree can also include predicate nodes and descendant nodes.

A primary node is a result node which is obtained when each query step of XPath query is completed during an XPath parsing process.

For example, for the example XPath query "/Article [@SN=100]/Author[Age<30]/Name" shown in FIG. 4, the primary node in first query step ("/Article [@SN=100]") is "Article", the primary node in second query step ("/Article [@SN=100]/Author [Age<30]") is "Author", and the primary node in third query step ("/Article[@SN=00]/Author [Age<30]/Name") is "Name".

Each of primary nodes $PriNode_i$ (i=1, 2, ... n) includes parameters of SPid, PreNodes, SecNodes. The parameter SPid indicates ID assigned to a primary node in the simple path file. The parameter PreNodes indicates predicate nodes of the primary node. The parameter SecNodes indicates descendant nodes of the primary node.

Each of primary nodes corresponds to a plurality of predicate nodes $PreNode_{i1}, \ldots, PreNode_{ij}, \ldots, PreNode_{im}$, where m is a positive integer.

Each of predicate nodes $PreNode_{ij}$ (j=1, 2, ... m) includes parameters SPid, Position Info, Expression Info and PreNodes. The parameter SPid indicates ID assigned to a predicate node in the simple path file. The parameter Position Info indicates position information of the predicate node. The parameter Position Info also includes four sub-parameters: Co-Anc Level, Self Level, PriNode Level, and Relative Order. The sub-parameter Co-Anc Level indicates the level of co-ancestor node of the predicate node and primary node in the tree structure of the simple path repository. The sub-parameter Self Level indicates the level of the predicate node itself in the tree structure of the simple path repository. The sub-parameter PriNode Level indicates the level of the primary node in the tree structure of the simple path repository. The sub-parameter Relative Order indicates the relative order relationship between the predicate node and primary node.

Figure 8:
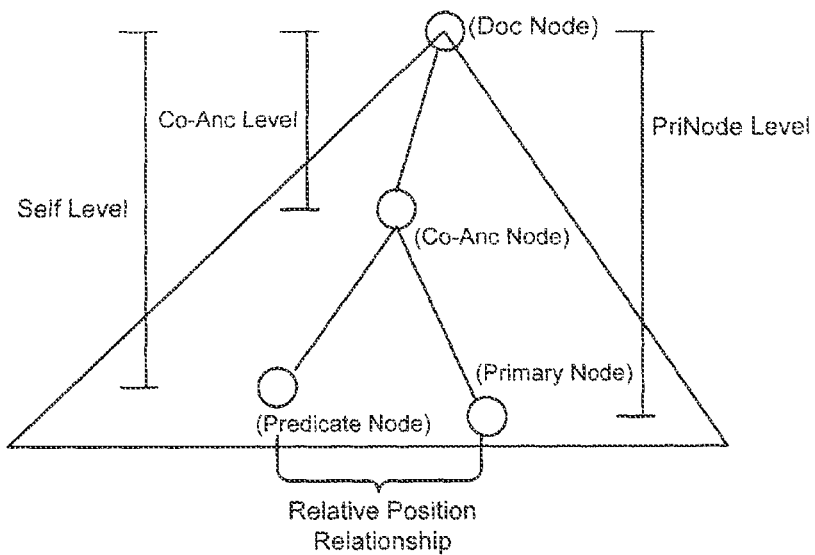
FIG. 8 is a schematic diagram illustrating the relationships between nodes according to an embodiment of the present invention.

The previously described relationships are schematically shown in FIG. 8. As shown in FIG. 8, there exists a document node (Doc node or root node), a co-ancestor node (Co-Anc node), a predicate node and a primary node. "Self Level" indicates the level of the predicate node itself. "Co-Anc Level" indicates the level of the co-ancestor node. "PriNode Level" indicates the level of the primary node. The relative position relationship between the predicate node and primary node are also shown in FIG. 8. The primary node can be located in the same level as that of the predicate node, or can be located at a level different from that of the predicate node.

The parameter Expression Info (as shown in FIG. 5) indicates expression information of the predicate node. The parameter Expression Info also includes two sub-parameters: Operator and Value. The sub-parameter Operator indicates the operator for the predicate node. The sub-parameter Value indicates the value of the predicate node.

The parameter PreNodes indicates predicate nodes of the predicate node. Each predicate node can also correspond to a plurality of predicate nodes, such as, $PreNode_{ij1}$, $PreNode_{ij2}, \ldots, PreNode_{ijt}$, where t is a positive integer.

Each primary node can correspond to a plurality of descendant nodes $SecNode_{i1}, \ldots, SecNode_{ik}, \ldots, SecNode_{is}$, where s is a positive integer. For example, as shown in FIG. 3, the node "Author" can include three descendant nodes, i.e. "Name", "Age" and "Gender". Each of descendant nodes $SecNode_{ik}$ (k=1, 2, ..., s) includes parameters SPid and PreNodes. The parameter SPid indicates ID assigned to a descendant node in the simple path file. The parameter PreNodes indicates predicate nodes of the descendant node.

The parameter PreNodes includes two sub-parameters: Self Level and Relative Order. The sub-parameter Self Level indicates the level of the predicate node itself in the tree structure of the simple path repository. Sub-parameter Relative Order indicates the relative order relationship between the predicate node and the descendant node.

The meanings of these parameters as shown in FIG. 5 are well known in the relevant art. It should be understood by a person skilled in the art that these parameters are interpreted only with respect to a particular structure of execution tree hereinabove, and the present invention is not limited to these parameters. In some cases, more general meanings of these parameters can be used. For example, the parameter SPid indicates ID assigned to a node in the simple path file, the parameter Co-Anc Level indicates the level of a co-ancestor node of two nodes in the tree structure of the simple path repository, the parameter Self Level indicates the level of one node itself in the tree structure of the simple path repository, and the parameter Relative Order indicates the relative order relationship between two nodes, etc.

A method for generating an execution tree is now described with reference to FIG. 6. The method for generating an execution tree according to the present invention is performed step by step for a simple path file according to an input XPath query. For example, the process for generating an execution tree begins from the root node of a simple path file.

Figure 6:
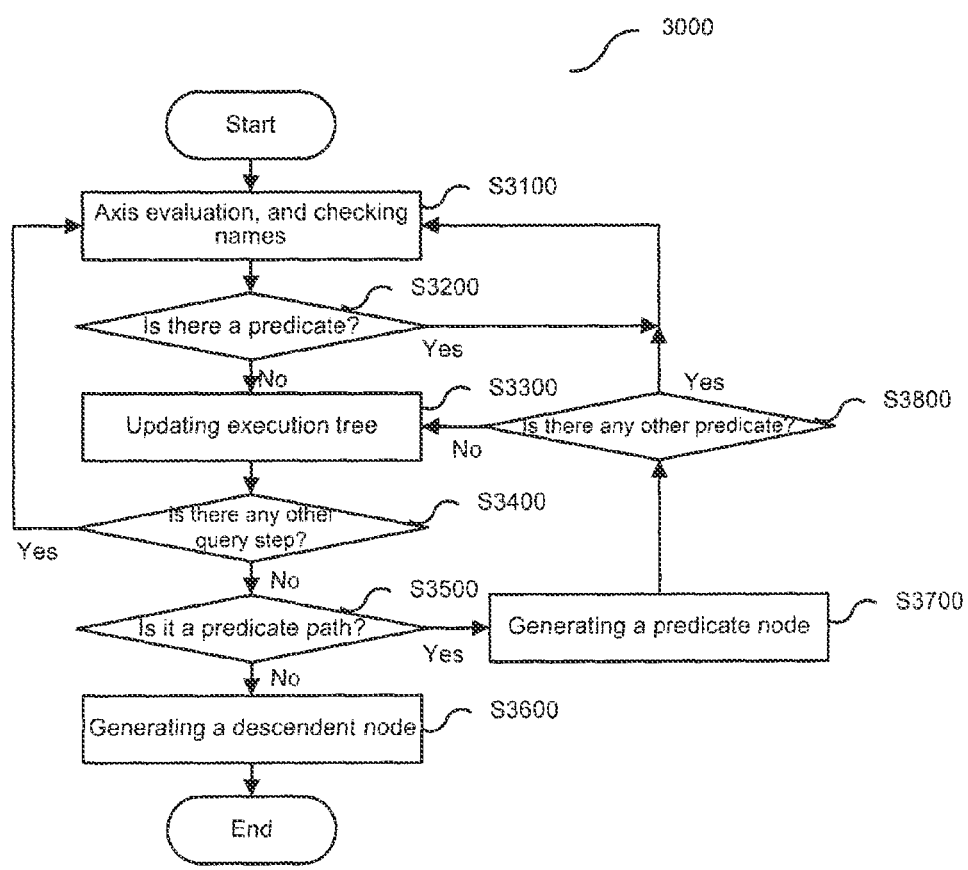
FIG. 6 is a flowchart showing a method for generating an execution tree according to an embodiment of the present invention.

As shown in step s3100 of FIG. 6, an axis evaluation is performed and names are checked. In this step, there is first a check as to whether or not there exists an axis in the input XPath query. The axis is well known in the art. With respect to each context node in each array of primary nodes, the possible result nodes for this axis can be found from the simple path file by an axis evaluation.

There may exist two set of axes as follows.

The first set of axes includes CHILD/ATTRIBUTE/NAMESPACE/SELF/DESCENDANT/DESCENDANT-OR-SELF axes. These axes are well known in the art. For example, with respect to one context node in the simple path file, the result nodes of its CHILD axis are the child nodes of the node.

The second set of axes includes FOLLOWING-SIBLING/PRECEDING-SIBLING/FOLLOWING/PRECEDING/ANCESTOR/PARENT/ANCESTOR-OR-SELF axes. In this step, the axis evaluation is performed according to the XPath query. For example, an axis (such as FOLLOWING-SIBLING) can be selected to perform the evaluation of the XPath query.

Then, the names in the inputted XPath query are checked to select, as the current primary node, a node in the simple path file which has the same name as that in the XPath query. For example, the name in the XPath query can include node name or attribute name. For example, it is determined whether the name in the XPath query is consistent with that in the simple path file. If it is determined that the name in the XPath query is consistent with that in the simple path file, then the process proceeds to step S3200.

In step S3200, it is determined whether the current primary node has a predicate. The current primary node refers to a node which is currently being processed (for example, a parsing process). If the current evaluation is a predicate evaluation, then the current primary node may, for example, also be a predicate node.

If the current primary node does not have a predicate, then the process proceeds to step S3300. If the current primary node has a predicate, then the process returns to step S3100, to perform a predicate evaluation, where the axis evaluation is started and names are checked once again.

In step S3300, the execution tree is updated. The step of updating the execution tree comprises updating primary nodes and predicate nodes. The updating of the execution tree is described in detail below.

In step 33400, it is determined whether there exists any other (not completed) query step according to the inputted XPath query. For example, the query step is the current query step of the XPath query, that is, a step in the current query branch (for example, a primary node evaluation branch or predicate evaluation branch).

If there exists any other query step, then the process returns to step S3100, and the axis evaluation is started and names are checked once again. If there does not exist any other query step, then the process proceeds to step S3500.

In step S3500, it is determined whether the current evaluation is a predicate evaluation. If the current evaluation is a predicate evaluation, then the process proceeds to step S3700. If the current evaluation is not a predicate evaluation, the process proceeds to step S3600. It can be seen from FIG. 6 that the predicate evaluation is actually the same as an XPath evaluation.

The position relationships between predicate nodes and primary nodes are recorded in the predicate path. For example, the position relationships are recorded in the Position Info domain of a predicate node.

In step S3700, predicate nodes are generated.

In step S3800, it is determined whether there exists any other predicate node. If there exists any other predicate node, then the process returns to step S3100, and the axis evaluation is started and names are checked once again. If there does not exist any other predicate node, then the process proceeds to step S3300, and the execution tree is updated.

In the process of updating execution tree, since the simple path file does nor contain any information about the document order of nodes of XML Instances in an XML data repository, predicate nodes can be added to reflect relative order information of nodes in the XPath query. For example, when some axes related to document order such as the FOLLOWING-SIBLING axis, PRECEDING-SIBLING axis, FOLLOWING axis, and PRECEDING axis are evaluated, the result nodes of these axes may be preceding nodes or following nodes in the simple path file. Also, context nodes can be added as predicate nodes into the result nodes of the evaluated axis in order to invalidate those nodes which do not belong to the result of the input query.

It is noted that one above described context node is added as a predicate node into the result nodes of the evaluated axis. The value of the relative order of the predicate node should be set to the reverse value in the execution tree with the axis newly generated.

For example, when the "FOLLOWING-SIBLING" axis in "A/B/FOLLOWING-SIBLING::C" is evaluated, the context node is "/A/B", and the result node is "/A/C". Therefore, in the last step of the axis evaluation, a relative order value "PRECEDING-SIBLING" is added to the context node "/A/B" as the predicate node, in the newly generated execution tree.

When the evaluation of a step of the inputted XPath query is complete, the context primary node is updated by the newly generated primary node PriNode. The position information Position Info (sub-parameter Self Level, sub-parameter PriNode Level, sub-parameter Co-Anc Level and sub-parameter Relative Order) of the predicate nodes of the context primary node need to be updated, so that correct relative position relationships between the newly generated primary node and predicate nodes can be maintained.

The sub-parameter Self Level does not need to be updated.

The sub-parameter PriNode Level can be easily updated to the step evaluation result, that is, the level of the context primary node.

Regarding the sub-parameter Co-Anc Level, with respect to the PARENT/ANCESTOR/ANCESTOR-OR-SELF axes, if the result node is the ancestor node of the original Co-Anc node, updating should be performed.

Regarding the sub-parameter Relative Order, with respect to the FOLLOWING-SIBLING/PRECEDING-SIBLING/PRECEDING/PRECEDING axes, updating should be performed.

In step S3600, descendant nodes of the primary node are generated.

Finally, the generation of an execution tree is completed.

The previously described method for generating an execution tree is an example embodiment. However, it should be understood by a person skilled in the art that the present invention is not limited to this method. There are many other ways for generating an execution tree. For example, the steps which are different from those of the above method can be used, some steps can be added into the above method, or some steps can be deleted from the above method. These and other ways are also encompassed by the present invention.

An example of generating an execution tree is now described with reference to FIGS. 3 and 7.

For example, the tree structure of the generated simple path file is illustrated by "b. Tree Structure of Simple Path File" as shown in FIG. 3. For example, an input XPath query is "/Article[@SN=100]/Author/[Age<30]/Name".

Figure 7A:
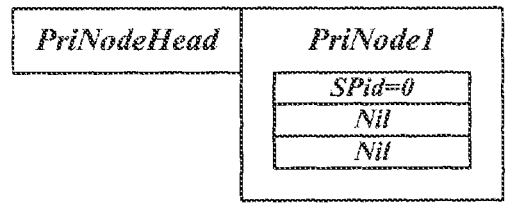
FIGS. 7A, 7B, 7C and 7D are diagrams schematically showing an example for generating an execution tree according to an embodiment of the present invention.

A first step beginning from the root node is shown in FIG. 7A. The first step evaluation is an execution tree which only has a root node. As shown in FIG. 7A, PriNodeHead indicates the header of the execution tree. PriNode1 indicates the primary node of the execution tree.

In the first step, the primary node is the root node. SPid of the root node is 0, and its parameters PreNodes and SecNodes are "Nil(null)".

Figure 7B:
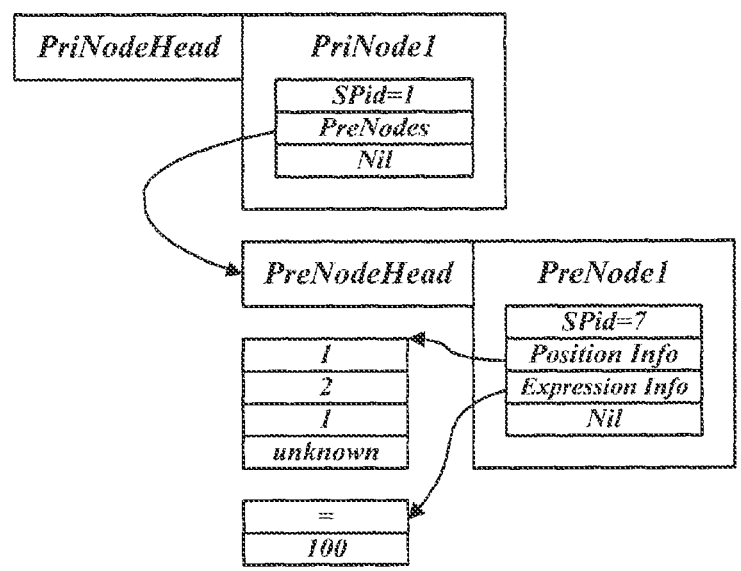

A second step is shown in FIG. 7B. In the second step, "/Article [SN=100]" is evaluated. As shown in FIG. 7B, the primary node is updated to be "Article". Its SPid is equal to 1.

There exists a predicate node. The predicate node is "SN", and its SPid is equal to 7. Its parameter Position Info is "1", "2", "1" and "unknown", which indicate that the ancestor node (i.e. node "Article") of the predicate node and primary node is located in the first level, the predicate node itself is located in the second level, the primary node is located in the first level, and there is no limitation for the relative order between the predicate node and primary node. Its parameter Expression Info is "=" and "100", which indicate that the operator is "=", and value is "100". Its parameter PreNode is "Nil", which indicates that the predicate node does not have any other predicate nodes.

Figure 7C:
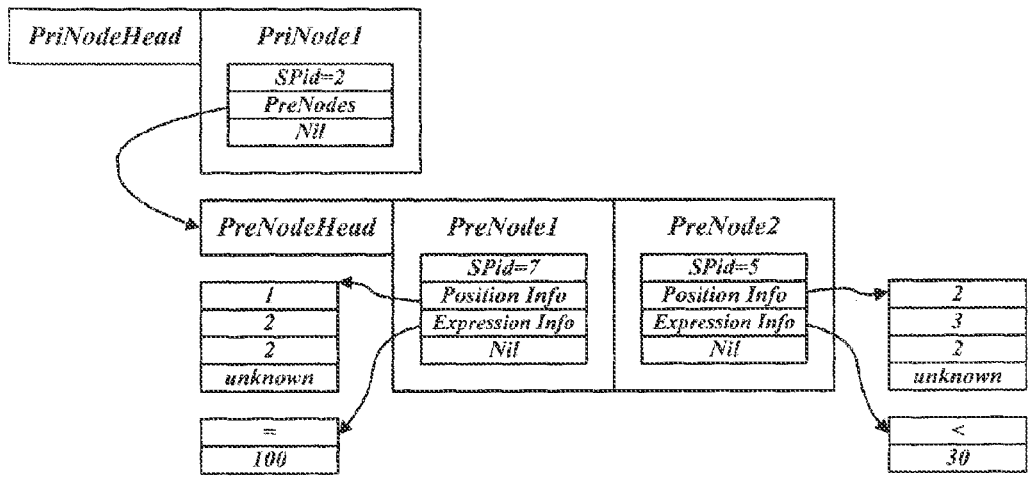

A third step is shown in FIG. 7C. In the third step, "/Article[@SN=100]/Author/[Age<30]" is evaluated. As shown in FIG. 7C, the primary node is updated to be "Author". Its Spid is equal to 2.

There exist two predicate nodes.

The first predicate node is the node "SN". Its SPid is equal to 7. Its parameter Position Info is "1", "2", "2" and "unknown". Its parameter Expression Info is "=" and "100". Its parameter PreNode is "Nil.".

The second predicate node is the node "Age". Its SPid is equal to 5. Its parameter Position Info is "2", "3", "2" and "unknown". Its parameter Expression Info is "<" and "30". Its parameter PreNode is "Nil".

Figure 7D:
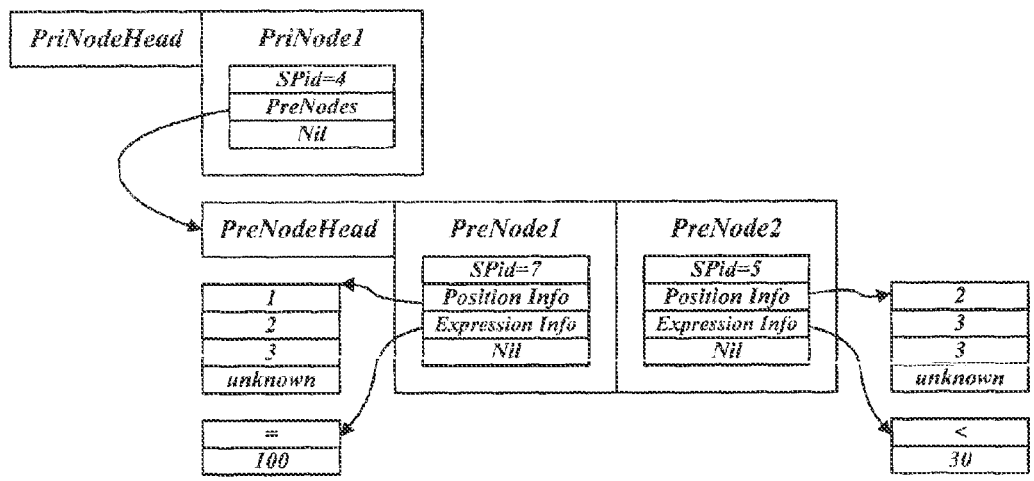

A fourth step is shown in FIG. 7D. In the fourth step, "/Article[@SN=100]/Author/[Age<30]/Name" is evaluated. As shown in FIG. 7D, the primary node is updated to be "Name". Its Spid is equal to 4.

There exist two predicate nodes.

The first predicate node is the node "SN". Its SPid is equal to 7. Its parameter Position Info is "1", "2", "3" and "unknown". Its parameter Expression Info is "=" and "100". Its parameter PreNode is "Nil".

The second predicate node is the node "Age". Its SPid is equal to 5. Its parameter Position Info is "2", "3", "3" and "unknown". Its parameter Expression Info is "<" and "30". Its parameter PreNode is "Nil".

There exist no other steps thereafter. Therefore, the final execution tree obtained by the method is as shown in FIG. 7D.

It should be understood by a person skilled in the art that the present invention is not limited to the previously described example of generating an execution tree.

The evaluation of an execution tree is now described with reference to FIGS. 3, 7 and 9.

For example, as shown in FIG. 3, the data repository includes the two instances "a1. Instance 1" and "a2. Instance 2". The tree structure of the simple path file is illustrated by "b. Tree Structure of Simple Path File" as shown in FIG. 3. The generated execution tree is shown in FIG. 7D.

Figure 9:
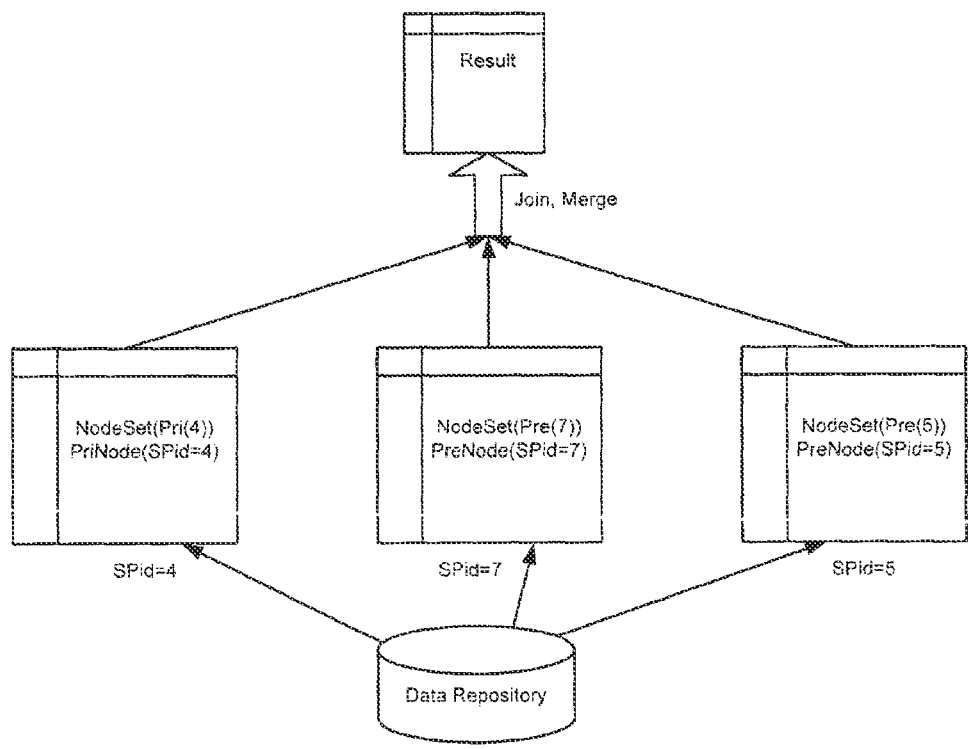
FIG. 9 is a schematic diagram showing an example of evaluation based on an execution tree according to an embodiment of the present invention.

As shown in FIG. 9, data is retrieved from the data repository according to the generated execution tree. For example, the collection of nodes satisfying "SPid=4" can be retrieved from the data repository as the collection of primary nodes, the collection of nodes satisfying "SPid=7" can be retrieved from the data repository as the collection of predicate nodes, and the collection of nodes satisfying "SPid=5" can be retrieved from the data repository as the collection of predicate nodes.

Then, the retrieved collections of nodes are ordered, joined and merged, so that a final result can be obtained. For example, in the example of FIG. 3, the final result may be the name "John".

Furthermore, data can be stored, in an orderly manner, in data repository in advance according to each node in the simple path file. So, when a retrieval is performed for the data repository according to the execution tree, the retrieved data are orderly. Therefore, the ordering step can be omitted. The processing efficiency would be further improved.

It is noted that the previously described evaluation process of an execution tree is only an example, and it should be understood by a person skilled in the art that the previous example is only intended to be illustrative but not to limit the present invention. It can be envisaged by a person skilled in the art to carry out the evaluation of the execution tree in many other ways.

For example, it is possible to carry out the method and system of the present invention through software, hardware, firmware or any combination thereof. The above described order of the steps for the method is only intended to be illustrative, and the steps of the method of the present invention are not limited to the above specifically described order unless otherwise specifically stated. In some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail as examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. A computer program product for XPath evaluation in an XML data repository, comprising:
    a non-transitory computer readable storage medium having program instructions embodied therewith, the program instructions executable by a processor to cause the processor to:
    generate a simple path file comprising an XML file by merging nodes of hierarchical architectures of a plurality of XML files in the data repository to form a hierarchical architecture, the simple path file including a tree-like structure for the hierarchical architecture comprising nodes corresponding to storage blocks in the data repository that store data from the plurality of XML files, each of at least one node in the hierarchical architecture of the simple path file corresponding to a plurality of nodes with at least two of the plurality of nodes from different ones of the plurality of XML files, and node names of nodes in the generated XML file are generated by recording tag information of respective nodes in the plurality of XML files in the data repository;
    store data in the data repository in an orderly manner according to each node in the hierarchical architecture of the simple path file;
    parse an input XPath query by applying the XPath query to the hierarchical architecture of the simple path file to generate an execution tree for the XPath query, wherein the execution tree includes a tree-like structure with nodes including identifiers referencing nodes in the hierarchical architecture of the simple path file for obtaining data; and
    execute the execution tree for the data repository to generate a final evaluation result by retrieving data of the plurality of XML files from the storage blocks in the data repository corresponding to the nodes of the hierarchical architecture of the simple path file referenced by the execution tree and combining the retrieved data to produce the final evaluation result.

2. The computer program product according to claim 1, wherein the simple path file is updated by XML files added into the data repository.

3. The computer program product according to claim 1, wherein the execution tree includes primary nodes, and the primary nodes comprise result nodes that are obtained in response to each query operation of the XPath query being completed during parsing of the XPath query.

4. The computer program product according to claim 3, wherein the parsing of the XPath query further comprises:
   performing an axis evaluation and checking names in the XPath query to select, as a current primary node, a node in the simple path file having a name that is consistent with a corresponding name in the XPath query;
   determining whether the current primary node includes a predicate, wherein the predicate includes expression information associated with the current primary node; and
   in response to the current primary node not including a predicate, updating the execution tree.

5. The computer program product according to claim 4, wherein the parsing of the XPath query further comprises:
   in response to the current primary node including a predicate, performing a predicate evaluation to determine whether the expression information is relevant to the XPath query.

6. The computer program product according to claim 5, wherein the parsing of the XPath query begins from a root node of the simple path file.

7. The computer program product according to claim 5, wherein updating the execution tree further comprises:
   adding a predicate node to reflect information on a relative order of the nodes in the XPath query.

8. The computer program product according to claim 7, wherein updating the execution tree further comprises:
   updating position information of the predicate node.

9. The computer program product according to claim 1, wherein the simple path file includes the tree-like structure comprising a root node and child nodes.

* * * * *